(12) United States Patent
Park et al.

(10) Patent No.: US 11,759,745 B2
(45) Date of Patent: Sep. 19, 2023

(54) APPARATUS FOR REDUCING FINE DUST USING LIGHTWEIGHT MIXED AIR

(71) Applicant: NATIONAL DISASTER MANAGEMENT RESEARCH INSTITUTE, Ulsan (KR)

(72) Inventors: Dugkeun Park, Ulsan (KR); Sujung Im, Ulsan (KR); Sungwook Kim, Busan (KR)

(73) Assignee: NATIONAL DISASTER MANAGMENT RESEARCH INSTITUTE, Ulsan (KR)

( * ) Notice: Subject to any disclaimer, the term of this patent is extended or adjusted under 35 U.S.C. 154(b) by 50 days.

(21) Appl. No.: 17/585,916

(22) Filed: Jan. 27, 2022

(65) Prior Publication Data
US 2022/0143541 A1    May 12, 2022

Related U.S. Application Data

(63) Continuation of application No. PCT/KR2020/011456, filed on Aug. 27, 2020.

(30) Foreign Application Priority Data

Sep. 18, 2019    (KR) .......................... 10-2019-0114537

(51) Int. Cl.
*B01D 47/16*    (2006.01)
*B01F 23/231*    (2022.01)
(Continued)

(52) U.S. Cl.
CPC .............. *B01D 47/16* (2013.01); *B01F 23/19* (2022.01); *B01F 23/231* (2022.01);
(Continued)

(58) Field of Classification Search
CPC ........ B01D 47/16; B01D 53/78; B01D 53/79; B01F 23/19; B01F 23/231; B01F 23/551;
(Continued)

(56) References Cited

FOREIGN PATENT DOCUMENTS

| CN | 109663432 A | 4/2019 |
|----|-------------|--------|
| JP | 3795411 B2 | 7/2006 |

(Continued)

OTHER PUBLICATIONS

International Search Report dated Dec. 1, 2020 in International Application No. PCT/KR2020/011456, in 4 pages.

*Primary Examiner* — Stephen Hobson
(74) *Attorney, Agent, or Firm* — Knobbe, Martens, Olson & Bear, LLP

(57) ABSTRACT

This application relates to an apparatus for reducing fine dust by using lightweight mixed air. The apparatus may include an apparatus main body configured to introduce and mix external air and remove the fine dust through adsorption, a seal type air mixing unit configured to mix the introduced external air and helium gas, an adsorption solution production unit configured to produce an adsorption solution for adsorbing the fine dust. The apparatus may also include an air bubble generation unit configured to generate air bubbles, emitted to outside, by using the adsorption solution, a flow control unit configured to control flow of air, so as to induce air bubble generation in the air bubble generation unit. The apparatus may further include a controller installed in a part of the apparatus main body and configured to control operations of the above units of the apparatus.

6 Claims, 6 Drawing Sheets

(51) Int. Cl.
    *B01F 23/10*           (2022.01)
    *B01F 23/50*           (2022.01)
    *B01F 35/221*          (2022.01)
    *B01F 101/00*         (2022.01)

(52) U.S. Cl.
    CPC ........ *B01F 23/551* (2022.01); *B01F 35/2211*
            (2022.01); *B01F 2101/2204* (2022.01)

(58) Field of Classification Search
    CPC ......... B01F 35/2211; B01F 2101/2204; Y02A
                                                      50/2351
    See application file for complete search history.

(56) References Cited

FOREIGN PATENT DOCUMENTS

| | | |
|---|---|---|
| JP | 5841732 B2 | 1/2016 |
| KR | 10-2014-0012205 A | 1/2014 |
| KR | 10-2002022 B1 | 7/2019 |

Figure 4

| minerals | | cation exchange capacity (meq/100g) |
|---|---|---|
| zeolite (clinoptilolite) | | 103.47 |
| feldspar | 1.0mm | 1.5 |
| | 74μm | 2.3 |
| | 40μm | 2.6 |
| | 23μm | 25.3 |
| porous feldspar | 100μm | 11.8 |
| | 74μm | 28.2 |

Figure 5

|  | clinoptilolite | porous feldspar | activated carbon | binder | cation exchange capacity (Cmol/kg) |
|---|---|---|---|---|---|
| mixed adsorbent | 4 | 4 | 1 | 1 | 430.1 |

Figure 6
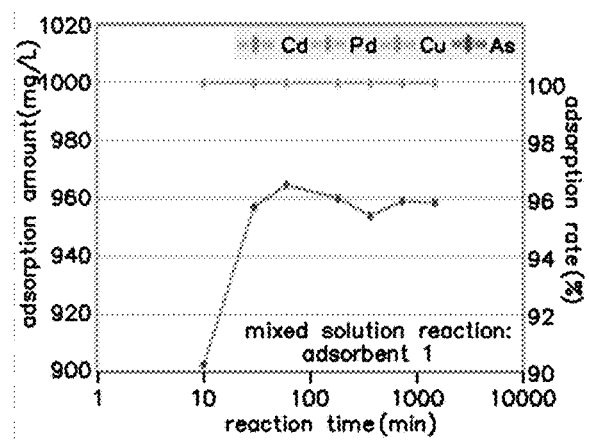
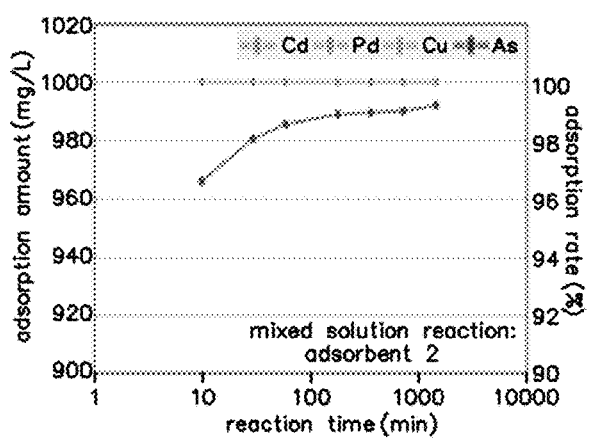

APPARATUS FOR REDUCING FINE DUST USING LIGHTWEIGHT MIXED AIR

CROSS-REFERENCE TO RELATED APPLICATIONS

This application is a continuation application, and claims the benefit under 35 U.S.C. § 120 and § 365 of PCT Application No. PCT/KR2020/011456 filed on Aug. 27, 2020, which claims priority to Korean Patent Application No. 10-2019-0114537 filed Sep. 18, 2019, the contents of each of which are hereby incorporated by reference in their entirety.

BACKGROUND

Technical Field

The present disclosure relates to an apparatus for reducing fine dust and, more particularly, to an apparatus for reducing fine dust using lightweight mixed air, the apparatus generating air bubbles by using the lightweight mixed air to adsorb and remove the fine dust.

Description of Related Technology

In general, fine dust refers to particulate matter floating in the air, and is substantially generated when burning fossil fuels such as coal and oil, or is generated from exhaust gases of factories and automobiles. The fine dust is divided into fine dust having a particle size smaller than 10 μm and ultrafine dust having a particle size smaller than 2.5 μm, and the composition thereof may vary depending on regions of occurrence, seasons, and weather conditions.

SUMMARY

Accordingly, the present disclosure has been devised to solve the above problems, and an objective of the present disclosure for solving the above problems is to provide an apparatus for reducing fine dust using lightweight mixed air, wherein the apparatus is manufactured in a structure wherein the apparatus is a wall-mounted type or a movable type, air bubbles are emitted from a lower part of the apparatus, fine dust is adsorbed by an adsorption pad installed on an upper part of the apparatus, and a defoamed liquid surfactant solution falls to the lower part of the apparatus and is recycled, thereby reducing the fine dust.

The technical problems to be achieved in the present disclosure are not limited to the technical problems mentioned above, and other technical problems that are not mentioned will be clearly understood by those skilled in the art to which the present disclosure belongs from the following description.

The present disclosure is devised to improve the problems of the related art as described above, and includes: an apparatus for reducing fine dust using lightweight mixed air, the apparatus being configured to adsorb the fine dust by using the lightweight mixed air and comprising: an apparatus main body configured to introduce and mix external air and remove the fine dust through adsorption; a seal type air mixing unit provided in a part of the apparatus main body and configured to mix the introduced external air and helium gas; an adsorption solution production unit provided in a part of the apparatus main body and configured to produce an adsorption solution for adsorbing the fine dust; an air bubble generation unit connected to the adsorption solution production unit while being connected to the air mixing unit and configured to generate air bubbles, emitted to outside, by using the adsorption solution; a flow control unit connected to each of the air mixing unit and the air bubble generation unit, and configured to control flow of air, so as to induce air bubble generation in the air bubble generation unit; and a controller installed in a part of the apparatus main body and connected to each of the air mixing unit, the adsorption solution production unit, the air bubble generation unit, and the flow control unit, so as to control operations of the air mixing unit, the adsorption solution production unit, the air bubble generation unit, and the flow control unit.

In addition, the air mixing unit may include: pressure gauges configured to respectively control inflows of external inlet air and helium gas; an air stirring tank configured to stir the mixed air while receiving the mixed air introduced through the pressure gauges; and a heating member installed in a part of the air stirring tank to maintain the mixed air introduced through the pressure gauges at a set temperature.

In addition, the adsorption solution production unit may include: a mixed adsorbent produced by mixing, at a set ratio, materials of clinoptilolite (i.e., zeolite), porous feldspar, activated carbon, and binder powder that is a binder, the materials each having a set particle size; mixed water mixed with the mixed adsorbent at a set ratio to dilute the mixed adsorbent; and a shaker configured to generate the adsorption solution by shaking and stirring the mixed adsorbent and the mixed water for a set time, wherein the mixed adsorbent may be capable of ionic bonding, so as to adsorb the fine dust.

In addition, tension of the air bubbles may be improved by adding, to the adsorption solution, a set amount of starch syrup in order to prevent air bubble breaking (i.e., air bubble defoaming) due to water evaporation and atmospheric pressure decrease.

In addition, the air bubble generation unit may include: an adsorption solution container configured to accommodate the adsorption solution produced in the adsorption solution production unit and provided with an air bubble outlet formed in a part thereof; a rotary water wheel configured to move the adsorption solution while self-rotating with a lower semicircle thereof submerged in the adsorption solution container; springs attached to an outer boundary of the rotary water wheel in a state where the springs are spaced apart from each other in an interval set by a diameter of a set size so as to generate the air bubbles when the rotary water wheel rotates; and a rotary water wheel driver connected to the rotary water wheel to provide power for rotating the rotary water wheel.

In addition, the flow control unit may include: an air flow path connected to each of the air mixing unit and the air bubble generation unit, so as to allow the air mixing unit and the air bubble generation unit to communicate with each other; double blowers respectively installed on opposite sides of the air flow path, so as to guide air mixed in the air mixing unit to the air bubble generation unit; and a blower driver connected to each of the double blowers to provide power for operating the double blowers to operate.

In addition, the number of rotations of the double blowers may be adjusted by interworking with the rotary water wheel by control of the controller.

According to an exemplary embodiment of the present disclosure, in a process of air bubbles ascending, fine dust is removed through physical adsorption by the adsorption performance of purified water and the van der Waals forces acting between the air bubbles and the fine dust, and even when the air bubbles adsorbing the fine dust are descending due to an increased weight thereof, the removal action may be continued.

According to the exemplary embodiment of the present disclosure, in a case where mixed air bubbles adsorbing fine dust are defoamed, the mixed air bubbles adsorb the fine dust around, even while descending, due to the adsorption performance (i.e., chemical adsorption) of purified water (i.e., mixed water), and thus an effect of removing the fine dust may be obtained in the process of the ascending and descending of the air bubbles.

The effects of the present disclosure are not limited to the above-mentioned effects, and other objectives that are not mentioned will be clearly understood by those skilled in the art from the following description.

BRIEF DESCRIPTION OF THE DRAWINGS

The following drawings attached to the present specification illustrate a preferred exemplary embodiment of the present disclosure, and serve to further understand the technical spirit of the present disclosure together with the detailed description of the present disclosure to be described below, so the present disclosure should not be construed as being limited only to the matters described in the drawings.

FIG. 4 is a table illustrating cation exchange capacity by particle size of clinoptilolite and porous feldspar, which are mixed adsorbents.

FIG. 5 is a table illustrating the cation exchange capacity of the mixed adsorbents.

FIG. 6 is a graph illustrating an isothermal adsorption experiment of the mixed adsorbents.

DETAILED DESCRIPTION

Figure 1:
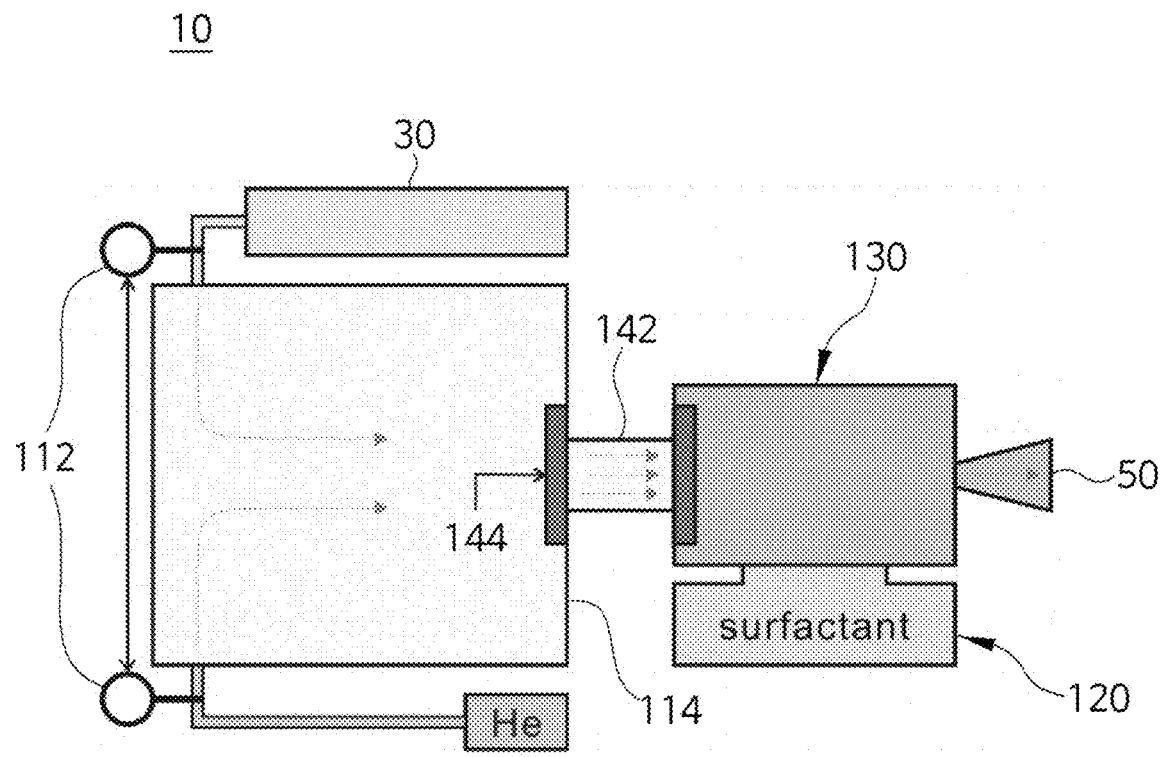
FIG. 1 is a conceptual view of an apparatus for reducing fine dust using lightweight mixed air according to the exemplary embodiment of the present disclosure.

Since the particle size of such fine dust is very small, the fine dust stays in the air, and then penetrates the lungs through the respiratory system of a person or moves into the body through blood vessels, whereby it is possible to adversely affect health. Recently, as the concentration of fine dust in the air gradually increases, various apparatuses for reducing fine dust in the air indoors and outdoors have been developed.

For example, in an exemplary embodiment of a conventional fine dust removal apparatus, the apparatus is provided with an impeller and an impeller driver, which are configured to allow external air containing fine dust to be introduced into a first inner space, and includes: a main body part configured to allow the air introduced into the first inner space to be transferred along a transfer path; and a fine dust removal part connected to an upper side of the main body part and extended in the vertical direction of the ground, so as to remove fine dust contained in the air transferred along the transfer path. The impeller driver is configured to reduce noise, generated during the operation of the impeller, by a variable speed pulley provided such that two pulleys having different diameters are stacked.

In this way, the conventional fine dust removal apparatus has a structure configured to remove fine dust contained in the air and at the same time reduce noise generated in the process of introducing external air containing the fine dust into the main body part of the fine dust removal apparatus.

In addition, referring to another exemplary embodiment of the related art, the exemplary embodiment includes a plurality of ion generation units configured to generate cations and anions, wherein the plurality of ion generation units constitutes an ion generation apparatus in which each of the plurality of ion generating units is arranged in a parallel structure, and emits cations and anions into the air flowing by the operation of a blower so that fine dust particles to which cations are attached and fine dust particles to which anions are attached are combined with each other, thereby inducing coarsening of the fine dust particles. Each of the plurality of ion generating units includes: a unit casing; a power supply unit built into the unit casing; a first electrode unit provided in the unit casing, so as to receive power supplied from the power supply unit and emit cations while generating a plasma discharge, the first electrode unit being formed to protrude from an air entry side to an upper surface of the unit casing relative to a direction of air flow caused by the blower; a second electrode unit provided in the unit casing, so as to receive the power supplied from the power supply unit and emit anions while generating the plasma discharge, the second electrode unit being formed to protrude from an air exit side to the upper surface of the unit casing relative to the direction of the air flow caused by the blower; and a flow path guide configured to face the first electrode unit therebetween, and composed of two plates having a structure protruding from the upper surface of the unit casing so that the cations generated by the first electrode unit is enabled to flow, without being scattered around, by riding on the air flow flowing between the two plates.

However, in the related art, since the structure of the apparatus is very complicated, there is a problem that the productivity is significantly reduced, and since fine dust is indirectly removed by a filtering method that separates the fine dust from the air, there is a problem that the removal efficiency of the fine dust is significantly lowered.

Hereinafter, exemplary embodiments of the present disclosure will be described in detail with reference to the accompanying drawings so that those skilled in the art can easily implement the present disclosure. However, since the description of the present disclosure is merely an exemplary embodiment for structural or functional description, the scope of rights of the present disclosure should not be construed as being limited by the exemplary embodiment described in the specification. That is, since the exemplary embodiment may have various changes and may have various forms, it should be understood that the scope of rights of the present disclosure includes equivalents capable of realizing the technical idea thereof. In addition, since the objectives or effects presented in the present disclosure do not mean that a specific exemplary embodiment should include all of the objectives or effects, or include only such effects, it should not be understood that the scope of rights of the present disclosure is limited thereby.

The meaning of the terms described in the present disclosure should be understood as follows.

Terms such as "first", "second", and the like are used to distinguish one component from another, so the scope of rights should not be limited by these terms. For example, the first component may be referred to as a second component, and similarly, the second component may be referred to as a first component. When a component is referred to as "connected" to another component, it may be directly connected to that other component. However, it should be understood that yet another component between each of the components may be present. In contrast, it should be understood that when a component is referred to as being "directly connected" to another component, there are no intervening components present. Meanwhile, other expressions that explain the relationship between components, such as "between", "directly between", "adjacent to", or "directly adjacent to" should be construed in the same way.

The singular expression is to be understood to include the plural expression unless the context clearly dictates otherwise. It will be further understood that the terms "comprise", "include", "have", and the like specify the presence of stated features, integers, steps, operations, elements, components, and/or combinations of them, but do not preclude the presence or addition of one or more other features, integers, steps, operations, elements, components, and/or combinations thereof.

All terms used herein have the same meaning as commonly understood by those skilled in the art to which the present disclosure belongs, unless otherwise defined. Terms defined in the dictionary generally used should be interpreted as being consistent with the meaning in the context of the related art, and it cannot be construed as having an ideal or overly formal meaning unless explicitly so defined in the present disclosure.

Figure 2:
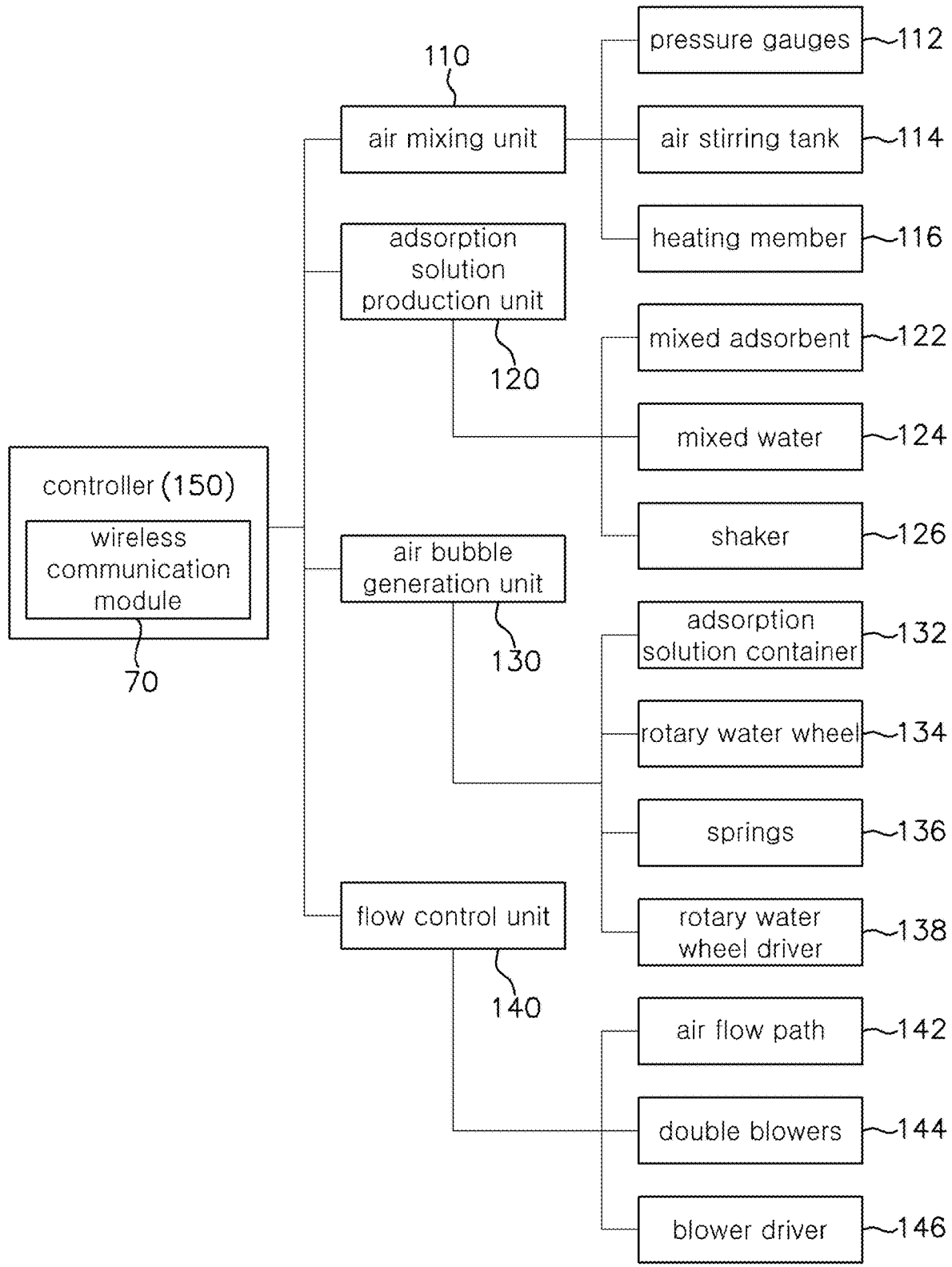
FIG. 2 is a block diagram of an overall configuration of the apparatus for reducing fine dust.
Figure 3:
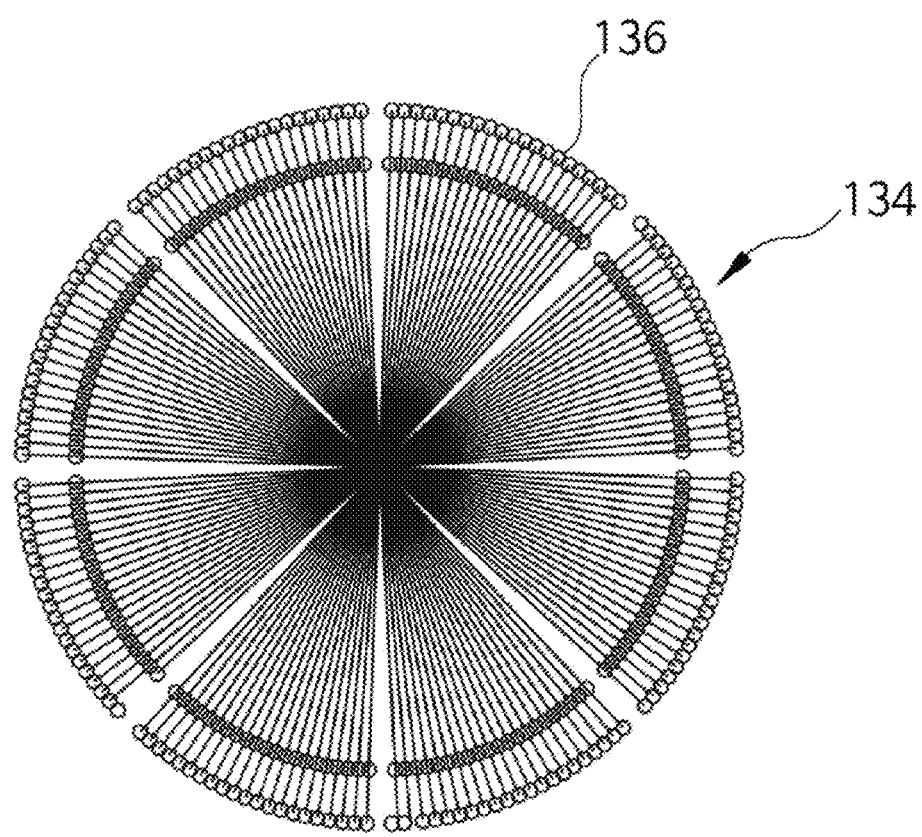
FIG. 3 is a detailed view of a rotary water wheel.

FIG. 1 is a conceptual view of an apparatus for reducing fine dust using lightweight mixed air according to the exemplary embodiment of the present disclosure, FIG. 2 is a block diagram of an overall configuration of the apparatus for reducing fine dust, FIG. 3 is a detailed view of a rotary water wheel, FIG. 4 is a table illustrating cation exchange capacity by particle sizes of clinoptilolite and porous feldspar, which are mixed adsorbents, FIG. 5 is a table illustrating the cation exchange capacity of the mixed adsorbents, and FIG. 6 is a graph illustrating an isothermal adsorption experiment of the mixed adsorbents.

As shown in FIGS. 1 to 6, as the apparatus for reducing the fine dust, the apparatus being configured to adsorb the fine dust by using the lightweight mixed air, the present disclosure may include: an apparatus main body 100, an air mixing unit 110, an adsorption solution production unit 120, an air bubble generation unit 130, a flow control unit 140, and a controller 150.

The apparatus main body 100 may remove fine dust by introducing external air to mix and adsorb the fine dust.

The air mixing unit 110 may be provided in a part of the apparatus main body 100 and have a seal type structure for mixing external inlet air and helium gas.

The air mixing unit 110 may include pressure gauges 112, an air stirring tank 114, and a heating member 116. Specifically, it is possible that the operation of the air mixing unit 110 may be controlled manually by an operator, or may be controlled automatically according to a program that is set by control of the controller 150.

The pressure gauges 112 may respectively control the inflow of the external inlet air and helium gas. Specifically, the pressure gauges 112 are provided on outer sides of the air stirring tank 114 and respectively installed on a helium storage tank and the air compressor 30 that introduces external air into the air stirring tank 114 under the control of the controller 150, whereby the inflow of air introduced into the air stirring tank 114 may be controlled.

While receiving the mixed air introduced through the pressure gauges 112, the air stirring tank 114 may stir the mixed air.

The heating member 116 may be installed in a part of the air stirring tank 114 to maintain the mixed air introduced through the pressure gauges 112 at a set temperature. Specifically, the heating member 116 may be a heating wire, a surface heating element, and the like, which are installed in the part of the inside of the air stirring tank 114 and dissipate heat under the control of the controller 150 so as to provide keeping warmth or heat insulation.

Specifically, the air mixing unit 110 sprays and stirs general air and helium gas to the warm air stirring tank 114 at a constant pressure to promote the ascending of air bubbles, so as to produce lightweight air bubbles and maintain the internal temperature of the warm air stirring tank 114 at 40° C. or higher. In addition, a mixing ratio of air and helium gas is determined to be 24:1 by using the pressure gauges 112. A pressure control valve may be configured to be further included, so as to enable adjustment of the mixing ratio to be 20:1 to 30:1 depending on atmospheric pressure.

In addition, most of fine dust is generated in winter and spring, and generated more frequently at temperatures below 10° C. Since air bubbles descend due to larger density thereof than that of air in comparison, general air and helium gas may be sprayed at the constant pressure in the warm air stirring tank 114, so that lightweight mixed air is produced and the density may be reduced through a heating process.

The adsorption solution production unit 120 is provided in a part of the apparatus main body 100 and may produce an adsorption solution for adsorbing fine dust.

The adsorption solution production unit 120 may include a mixed adsorbent 122, mixed water 124, and a shaker 126.

The mixed adsorbent 122 may be produced by mixing, at a set ratio, materials of clinoptilolite (i.e., zeolite), porous feldspar, activated carbon, and binder powder that is a binder, the materials each having a set particle size. Specifically, in the mixed adsorbent 122, a mixing ratio of the clinoptilolite (i.e., zeolite), porous feldspar, activated carbon, and binder powder that is the binder as a surfactant may be determined to be 4:4:1:1 in order to adsorb heavy metals and organic compounds, which are toxic substances contained in fine dust.

The mixed adsorbent 122 is capable of ionic bonding and may adsorb fine dust.

The mixed water 124 may be mixed with the mixed adsorbent 122 at a set ratio to dilute the mixed adsorbent 122. Here, in general, purified water may be used for the mixed water 124.

The shaker 126 may generate an adsorption solution by shaking and stirring the mixed adsorbent 122 and the mixed water 124 for a set time.

The tension of air bubbles may be improved by adding, to the adsorption solution, a set amount of starch syrup in order to prevent air bubble breaking (i.e., air bubble defoaming) due to water evaporation and atmospheric pressure decrease.

In addition, a coconut active agent, which is rapidly decomposed in a natural environment may be used for the surfactant, which is a binder used in the present disclosure.

That is, the particle size of the mixed adsorbent 122 is ideally 50 to 100 μm. In addition, the cation exchange capacity of the mixed adsorbent 122 is 430.1 cmol/kg, which is very high compared to that of the materials before mixing, and an aqueous solution reacted with the mixed adsorbent 122 also demonstrates a good pollution source removal rate. The aqueous solution may be produced by diluting water, which is the mixed water 124, and the mixed adsorbent 122 at a ratio of 10:1 and stirring the mixture on a shaker for 10 minutes.

Zeolite has a porous structure that may accommodate various cations such as Na+, K+, $Ca^{2+}$, and $Mg^{2+}$. Since these ions are weakly bound in this material, these ions may be easily ion-exchanged with other cations when in contact with a solution. Zeolite minerals mainly found in nature include analcime, chabazite, clinoptilolite, heulandite, natrolite, phillipsite, stilbite, etc.

Zeolites serves an ion-exchange role in various water purification processes, water softening processes, and processes in many other fields. In particular, in chemistry, zeolites may be used to separate molecules having a specific size and shape, and an analysis method using the same has been developed and utilized.

In addition, zeolites are also widely used as catalysts and adsorbents. In many chemical reactions, when the well-ordered pore-structure and appropriate acidity of these materials are utilized, reactants may be easily activated. Furthermore, zeolites may be used to more precisely separate gases, such as to remove water, carbon dioxide, and sulfur dioxide from low-quality natural gas.

The surfactant is a substance that reduces surface tension thereof by adsorbing to the interface in the dilute solution. Among surfactants, an active agent that is ionized in the aqueous solution and becomes an anion is called an anionic surfactant, and the anionic surfactant includes soap, alkyl benzenesulfonate, etc. In addition, an active agent that is ionized and becomes a cation is called a cationic surfactant, and the cationic surfactant includes higher amine halides, tetraammonium salts, alkylpyridinium salts, etc. In addition, an active agent that is ionized and becomes both of the anionic surfactant and cationic surfactant is called an amphoteric surfactant, and the amphoteric surfactant includes amino acids, etc.

While being connected to the air mixing unit 110, the air bubble generation unit 130 may be connected to the adsorption solution production unit 120, so that air bubbles emitted to the outside may be generated by using the adsorption solution.

The air bubble generation unit 130 may include an adsorption solution container 132, a rotary water wheel 134, springs 136, and a rotary water wheel driver 138.

The adsorption solution container 132 may have a structure in which the adsorption solution produced in the adsorption solution production unit 120 is accommodated, and the adsorption solution container 132 is provided with an air bubble outlet 50 formed in a part thereof.

The rotary water wheel 134 may move the adsorption solution while rotating by itself in a state where a lower semicircle thereof is submerged in the adsorption solution container 132. Specifically, it is possible that the adsorption solution accommodated in the adsorption solution container 132 is drawn up by using the rotary water wheel 134, air bubbles are formed by using double blowers 144, and the air bubbles is discharged through the air bubble outlet 50.

The springs 136 may be attached to an outer boundary of the rotary water wheel 134 in a state where the springs are spaced apart from each other in an interval (approximately 1 to 2 degree angles) set by a diameter (approximately 0.5 cm to 2 cm) of a set size, so as to generate air bubbles when the rotary water wheel rotates.

The rotary water wheel driver 138 may be connected to the rotary water wheel 134 so as to provide power for rotating the rotary water wheel 134. Specifically, as a motor built into the rotary water wheel driver 138, it is possible to select and use one of motors according to a working environment or situation, the motors including a DC motor, a stepping motor, a brushless motor, an induction motor, a linear motor, an ultrasonic motor, a coreless motor, etc.

Specifically, the air bubble generation principle in the air bubble generation unit 130 is a principle in which the adsorption solution container 132 and the springs 136 are configured to generate air bubbles as many as the number of rings of the springs 136 every time the rotary water wheel 134 rotates by lightweight mixed air introduced from the double blowers 144.

The flow control unit 140 may be connected to each of the air mixing unit 110 and the air bubble generation unit 130, and induce air bubble generation in the air bubble generation unit 13 by controlling the flow of air.

The flow control unit 140 may include an air flow path 142, double blowers 144, and a blower driver 146.

The air flow path 142 may be connected to each of the air mixing unit 110 and the air bubble generation unit 130 to enable the air mixing unit 110 and the air bubble generation unit 130 to communicate with each other.

The double blowers 144 may be respectively installed on opposite sides of the air flow path 142 to guide the air mixed in the air mixing unit 110 to the air bubble generation unit 130.

The blower driver 146 may be connected to the double blowers 144 to provide power for operating the double blowers 144.

Specifically, the number of rotations of the double blowers 144 may be configured to be synchronized with the number of rotations of the air bubble generation unit 130, so as to generate air bubbles of a constant size. Accordingly, in order to generate the air bubbles of a set size, it is preferable to maintain a ratio of 1:50 to 1:200 between the number of rotations of each double blower 144 and the number of rotations of the rotary water wheel 134 of the air bubble generation unit 130.

The controller 150 may be installed in a part of the apparatus main body 100, and may be connected to each of the air mixing unit 110, the adsorption solution production unit 120, the air bubble generation unit 130, and the flow control unit 140, so as to control the operations of the air mixing unit 110, the adsorption solution production unit 120, the air bubble generation unit 130, and the flow control unit 140.

By the control of the controller 150, the number of rotations of each double blower 144 may be adjusted in conjunction with the number of rotations of the rotary water wheel 134. Specifically, the number of rotations of each double blower 144 is about 2,000 to 6,000 revolutions per minute, and it is preferable that a ratio of the number of rotations of each double blower 144 and the number of rotations of the rotary water wheel 134 is 50:1 to 200:1.

The apparatus 10 for reducing the fine dust of the present disclosure may be operated through the controller 150 interworking with a mobile terminal and the like by using any one of a Wi-Fi communication module, a Bluetooth communication module, and a Zigbee communication module.

That is, the operator is able to use the apparatus 10 for reducing the fine dust by adopting any one method of the Bluetooth communication module, the Wi-Fi communication module, and the Zigbee communication module, but it is not limited to the above methods, and the best method may be selected to be used.

In addition, the apparatus 10 for reducing the fine dust of the present disclosure may adsorb fine dust by installing an adsorption pad on a part of the upper part thereof.

According to the exemplary embodiment of the present disclosure, in a process of air bubbles ascending, fine dust is removed through physical adsorption by the adsorption performance of purified water and the van der Waals forces acting between the air bubbles and the fine dust, and even when the air bubbles adsorbing the fine dust is descending due to an increased weight thereof, the removal action may be continued.

According to the exemplary embodiment of the present disclosure, in a case where mixed air bubbles adsorbing fine dust are defoamed, since the mixed air bubbles adsorb the fine dust around, even while descending, due to the adsorption performance (i.e., chemical adsorption) of purified water (i.e., mixed water), and thus an effect of removing the fine dust may be obtained in the process of the ascending and descending of the air bubbles.

The detailed description of the preferred exemplary embodiments of the present disclosure disclosed as described above has been provided to enable those skilled in the art to implement and practice the present disclosure. Although the above has been described with reference to the preferred exemplary embodiments of the present disclosure, it will be understood by those skilled in the art that various modifications and changes can be made to the present disclosure without departing from the scope of the present disclosure. For example, those skilled in the art may use each configuration described in the above-described exemplary embodiments in a way of combining with each other. Accordingly, the present disclosure is not intended to be limited to the exemplary embodiments shown herein but is to be accorded the widest scope consistent with the principles and novel features disclosed herein.

The present disclosure may be embodied in other specific forms without departing from the spirit and essential characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure. The present disclosure is not intended to be limited to the embodiments shown herein but is to be accorded the widest scope consistent with the principles and novel features disclosed herein. In addition, claims that are not explicitly cited in the claims may be combined to form an exemplary embodiment, or may be included as new claims by amendment after filing.

In the process of air bubbles ascending in the apparatus for reducing the fine dust using the lightweight mixed air, the fine dust is removed through physical adsorption by the adsorption performance of purified water and the van der Waals forces acting between the air bubbles and the fine dust, and the removal action may be continued even when the air bubbles adsorbing the fine dust is descending due to an increased weight thereof, thereby having industrial applicability.

What is claimed is:

1. An apparatus for reducing fine dust using lightweight mixed air, the apparatus being configured to adsorb the fine dust by using the lightweight mixed air and comprising:
   an apparatus main body configured to introduce and mix external air and remove the fine dust through adsorption;
   a seal type air mixing unit provided in a part of the apparatus main body and configured to mix the introduced external air and helium gas;
   an adsorption solution production unit provided in a part of the apparatus main body and configured to produce an adsorption solution for adsorbing the fine dust;
   an air bubble generation unit connected to the adsorption solution production unit while being connected to the air mixing unit and configured to generate air bubbles, emitted to outside, by using the adsorption solution;
   a flow control unit connected to each of the air mixing unit and the air bubble generation unit, and configured to control flow of air, so as to induce air bubble generation in the air bubble generation unit; and
   a controller installed in a part of the apparatus main body and connected to each of the air mixing unit, the adsorption solution production unit, the air bubble generation unit, and the flow control unit, so as to control operations of the air mixing unit, the adsorption solution production unit, the air bubble generation unit, and the flow control unit.

2. The apparatus of claim 1, wherein the adsorption solution production unit comprises:
   a mixed adsorbent produced by mixing, at a set ratio, materials of clinoptilolite, porous feldspar, activated carbon, and binder powder that is a binder, the materials each having a set particle size;
   mixed water mixed with the mixed adsorbent at a set ratio to dilute the mixed adsorbent; and
   a shaker configured to generate the adsorption solution by shaking and stirring the mixed adsorbent and the mixed water for a set time,
   wherein the mixed adsorbent is capable of ionic bonding, so as to adsorb the fine dust.

3. The apparatus of claim 1, wherein tension of the air bubbles is improved by adding, to the adsorption solution, a set amount of starch syrup in order to prevent air bubble breaking due to water evaporation and atmospheric pressure decrease.

4. The apparatus of claim 1, wherein the air bubble generation unit comprises:
   an adsorption solution container configured to accommodate the adsorption solution produced in the adsorption solution production unit and provided with an air bubble outlet formed in a part thereof;
   a rotary water wheel configured to move the adsorption solution while self-rotating with a lower semicircle thereof submerged in the adsorption solution container;
   springs attached to an outer boundary of the rotary water wheel in a state where the springs are spaced apart from each other in an interval set by a diameter of a set size so as to generate the air bubbles when the rotary water wheel rotates; and
   a rotary water wheel driver connected to the rotary water wheel to provide power for rotating the rotary water wheel.

5. The apparatus of claim 4, wherein the flow control unit comprises:
   an air flow path connected to each of the air mixing unit and the air bubble generation unit, so as to allow the air mixing unit and the air bubble generation unit to communicate with each other;
   double blowers respectively installed on opposite sides of the air flow path, so as to guide air mixed in the air mixing unit to the air bubble generation unit; and
   a blower driver connected to each of the double blowers to provide power for operating the double blowers to operate.

6. The apparatus of claim 5, wherein the number of rotations of the double blowers is adjusted by interworking with the rotary water wheel by control of the controller.

* * * * *